(12) United States Patent
Goedeke

(10) Patent No.: US 8,999,869 B2
(45) Date of Patent: Apr. 7, 2015

(54) GLASS-CERAMIC JOINING MATERIAL AND USE THEREOF

(71) Applicant: Schott AG, Mainz (DE)

(72) Inventor: Dieter Goedeke, Bad-Soden (DE)

(73) Assignee: Schott AG, Mainz (DE)

( * ) Notice: Subject to any disclaimer, the term of this patent is extended or adjusted under 35 U.S.C. 154(b) by 31 days.

(21) Appl. No.: 13/867,223

(22) Filed: Apr. 22, 2013

(65) Prior Publication Data

US 2013/0294818 A1 Nov. 7, 2013

(30) Foreign Application Priority Data

May 4, 2012 (DE) .......................... 10 2012 207 405

(51) Int. Cl.
| | |
|---|---|
| *C03C 10/06* | (2006.01) |
| *C03C 8/24* | (2006.01) |
| *C03C 8/02* | (2006.01) |
| *G03C 8/24* | (2006.01) |
| *C25B 9/00* | (2006.01) |
| *C03C 3/064* | (2006.01) |
| *C03C 10/00* | (2006.01) |
| *H01M 8/02* | (2006.01) |

(52) U.S. Cl.
CPC ... *G03C 8/24* (2013.01); *C25B 9/00* (2013.01); *C03C 3/064* (2013.01); *C03C 10/0036* (2013.01); *H01M 8/0282* (2013.01)

(58) Field of Classification Search
CPC ............ C03C 10/0045; C03C 10/0036; C03C 2214/20; C03C 3/064; C03C 3/066; C03C 3/068; C03C 8/24; C03C 8/245; C03C 8/02; C03C 8/04
USPC ....................... 501/2, 8, 15, 21, 73, 77, 78, 79
See application file for complete search history.

(56) References Cited

U.S. PATENT DOCUMENTS

| | | | |
|---|---|---|---|
| 5,112,777 A * | 5/1992 | MacDowell | ..................... 501/32 |
| 6,124,224 A | 9/2000 | Sridharan et al. | |
| 6,362,119 B1 * | 3/2002 | Chiba | ........................... 501/15 |
| 6,532,769 B1 | 3/2003 | Meinhardt et al. | |
| 2010/0086825 A1 | 4/2010 | Lamberson et al. | |
| 2011/0312482 A1 | 12/2011 | Goedeke et al. | |

FOREIGN PATENT DOCUMENTS

| | | |
|---|---|---|
| DE | 198 57 057 | 4/2000 |
| EP | 2 135 316 | 12/2009 |
| SU | 802 220 | 2/1981 |
| WO | 02/094727 | 11/2002 |

* cited by examiner

*Primary Examiner* — Noah Wiese

(74) *Attorney, Agent, or Firm* — Michael J. Striker

(57) ABSTRACT

The glass-ceramic joining material, which is suitable for bonding or joining at low processing temperatures, especially less than 800° C., is composed of a BaO—$SiO_2$—CaO—$B_2O_3$—$Al_2O_3$ system and has a coefficient of thermal expansion $\alpha_{(20\text{-}300)} \geq 9.5 \cdot 10^{-6}$ $K^{-1}$.

8 Claims, No Drawings

GLASS-CERAMIC JOINING MATERIAL AND USE THEREOF

CROSS-REFERENCE

The subject matter described and claimed herein below is also described in German Patent Application No. 10 2012 207 405.8, filed on May 4, 2012 in Germany. This German Patent Application provides the basis for a claim of priority of invention for the invention described and claimed herein below under 35 U.S.C. 119 (a)-(d).

BACKGROUND OF THE INVENTION

The present invention relates to glass-ceramic joining materials which can be processed at low temperatures and are suitable for sealing, especially of fuel cells or electrolysis cells at low joining temperatures, and further applications.

Glass-ceramic joining materials are understood in the context of the invention to mean materials which originate from an amorphous glass material, crystallize at least partly and are then in the form of glass-ceramic. These glass-ceramic joining materials can be used as glass solders, but also in the form of preforms etc.

Glass-ceramic joining materials are used especially for production of bonds, in order to bond particularly ceramic components to one another or to bond them to metal components in an electrically insulating manner. In the development of glass-ceramic joining materials, the composition thereof is often selected such that the coefficient of thermal expansion of the joining materials corresponds approximately to that of the components to be bonded to one another, in order to obtain a permanently stable bond. Compared to other joining materials, for example those of plastic, glass-ceramic joining materials have the advantage that they can be configured so as to give a hermetic seal, can withstand higher temperatures and degenerate less, if at all, even in the course of longer service lives.

Joining materials in the form of glass solders are generally often produced from a glass powder which, in the joining operation, also called soldering operation, is melted and gives rise to the bond with the components to be bonded under the action of heat. The joining temperature is generally selected at about the level of what is called the sphere temperature of the glass. The measurement of the sphere temperature is a standard test method known to those skilled in the art and can be effected with a heating microscope. If a crystallization-free glass as a joining material in the form of a glass powder is melted and cooled again such that it solidifies, it can typically also be melted again at the same melting temperature. For a bond with a joining material in the amorphous state, this means that the operating temperature to which the bond can be exposed for prolonged periods must not be higher than the joining temperature. In fact, the operation temperature in many applications must be significantly below the joining temperature, since the viscosity of the joining material decreases with rising temperature and a glass which is free-flowing to some degree can be pressed out of the bond at high temperatures and/or pressures, and so the bond can fail.

This problem can be solved by using glass-ceramic joining materials in which the amorphous base glass crystallizes at least partly or else completely in the course of the joining operation. In the context of the invention, partly or fully crystallized joining materials are called glass-ceramic joining materials or glass-ceramic for short. The crystalline phases of the ceramics generally have properties differing significantly from the amorphous base glass, for example with regard to thermal expansion or glass transition temperatures, such that the overall system composed of amorphous glass phase and crystalline phases, i.e. the glass-ceramic joining material overall, may likewise have different properties from the amorphous base glass alone. More particularly, the temperature required for the re-melting in the case of glass-ceramic joining materials may be well above that of the amorphous base glass.

Whether an amorphous base glass gives rise to an amorphous glass or a glass-ceramic in the joining operation, given suitable composition of the base glass, depends to a high degree on the process conditions in the bonding operation, more particularly on the heating and cooling curves.

One field of use of joining materials is, for example, that of bonds in fuel cells which can be used, for example, as a power source in motor vehicles or for localized energy supply. An important type of fuel cells is, for example, what are called solid oxide fuel cells (SOFCs). The bond with the joining material is typically used to produce fuel cell stacks, i.e. for the bonding of several individual fuel cells to give a stack. Such fuel cells are already known and are continuously being improved. High temperature fuel cells are widespread, these comprising particularly expensive materials which are difficult to produce, more particularly specific metals and/or alloys. Therefore, in the current development of fuel cells, lower operating temperatures are desired, especially because it is thus possible to use comparatively cheaper ferritic stainless steels which are easier to produce (for example AISI 410, AISI 430), and the use of specialty alloys such as Crofer22APU (Thyssen Krupp) or ZMG32 (Hitachi), which is otherwise necessary, is thus no longer required. At the operating temperatures which then occur, however, it is also necessary to use different cell materials and electrolytes since oxygen ion conductivity is otherwise not ensured. The materials used for low operating temperatures in the fuel cells require sealing materials that can be processed at low joining temperatures.

Apart from the known glass solder sealing, there are other sealing materials, but these entail considerable disadvantages. Mica seals might lead, for example owing to the alkali metal content, to increased oxidation of the metal, and provide sealing only under high pressures. Hermetic bonds are not achievable in this way.

The barium silicate glasses known to date have too high a softening temperature and joining temperature in order thus to be able to produce bonds at low joining temperature.

U.S. Pat. No. 6,532,769 describes joining glasses having a $SiO_2$ and $B_2O_3$ content of at least 35 mol %. Such a high proportion of $SiO_2$ lowers the coefficient of thermal expansion of the joining glass and leads to an unwanted increase in the melting temperatures.

WO 0294727 A1 likewise discloses SOFC joining glasses. Here, the glass compositions have $SiO_2$ contents between 33 and 35% by weight. The additions of PbO, MnO, $V_2O_5$ are undesirable because they are very substantially redox-stable. Especially elemental lead which forms is capable of forming alloys with the metallic interconnector and thus has a corrosion-promoting effect. MnO and $V_2O_5$ are likewise polyvalent elements. Mn and Cr from the ferritic steel can likewise enter into a multitude of bonds, the stability of which under operating conditions is questionable. The glasses mentioned are designed for joining temperatures above 800° C.; they cannot be used to achieve joining temperatures of 800° C. or less.

U.S. Pat. No. 6,124,224 discloses barium-containing glasses whose $SiO_2$ contents vary between 18 and 60% by weight. The joining temperatures of the glasses described are more than 900° C., and the coefficient of thermal expansion is between 5.0 and 7.4 ppm/K. Because one or both of the $SiO_2$ and $Al_2O_3$ contents are very high, they are unsuitable for fuel cell applications; more particularly, the thermal expansion values are not matched to the metals and cell components.

The glasses disclosed in DE 19857057 C1 have a high MgO content, and the $SiO_2$ content is between 35 and 55 mol %. Glasses having a high MgO content have very significant crystallization, and the high $SiO_2$ contents do not allow joining at temperatures of less than 800° C.

SU 802220 A1 describes barium-containing glasses suitable for soldering of titanium. In this document too, the $SiO_2$ contents are more than 32% by weight, and the addition oxides $TiO_2$ and $TeO_2$ are used. $TeO_2$ is an adhesion promoter and is said to increase chemical stability. The joining temperature specified is 1100° C.

EP 2135316 B1 describes barium-containing semicrystalline sealing glasses in solid oxide fuel cells containing at least 10 mol % of $SiO_2$.

None of these glasses are suitable for the production of bonds at a joining temperature not exceeding 800° C.

SUMMARY OF THE INVENTION

Against this background, it is an object of the invention to provide glass-ceramic joining materials which can be joined at temperatures not exceeding 800° C., and have a coefficient of linear thermal expansion $\alpha_{(20-300)}$ within the temperature range from 20° C. to 300° C. of at least $9.5 \cdot 10^{-6}$ $K^{-1}$, and the applications thereof.

This object is achieved by the joining materials and/or applications according to the appended independent claim or claims. Preferred embodiments are evident from the appended dependent claims.

All percentages stated hereinafter are, unless stated otherwise, in mol % based on oxide content.

The coefficient of thermal expansion $\alpha_{(20-300)}$ of the inventive glass-ceramic joining material is at least $9.5 \cdot 10^{-6}$ $K^{-1}$, preferably at least $10.5 \cdot 10^{-6}$ $K^{-1}$, and preferably not more than $12.5 \cdot 10^{-6}$ $K^{-1}$.

The sphere temperature of the amorphous starting glass is especially not more than 800° C.

The inventive glass-ceramic joining material contains 3% up to <10% of $SiO_2$. In the case of higher contents, $\alpha_{(20-300)}$ can fall to values of less than $9.5 \cdot 10^{-6}$ $K^{-1}$, and the processing temperature can rise. In further possible embodiments, the $SiO_2$ content is 3% to 4.7%. Upper limits which are likewise advantageous are 9.5%, 9%, 8.5% and/or 8%.

According to the invention, the $B_2O_3$ content is 16% to 34%. This content ensures a sufficiently large process window for the melting of the joining material. However, the upper limit should not be exceeded, since the chemical stability of the joining material would otherwise be lowered. Moreover, it may be the case for joining materials with high boron concentrations that boron vaporizes in the production of the joining material from the glass melt and/or in the course of melting for the joining process and/or during the operation of the component joined with the joining material. It thus cannot be ruled out that the material gradually changes over time, and that volatile boron exerts an adverse effect on the operation, for example, of the fuel cell or electrolysis cell. Within the limits described, the joining material has very good chemical stability which makes it usable, for example, in high-temperature electrolysis units (SOECs) too.

The total $SiO_2$ and $B_2O_3$ content in the inventive glass-ceramic joining material is preferably not more than 40% in total.

$Al_2O_3$ is present in the inventive joining material at from 7% to 15%. Higher contents may likewise lead to undesirably low values of $\alpha_{(20-300)}$ and increase the viscosity of the joining material to an excessive degree.

The inventive glass-ceramic joining material contains CaO at from 8% to 40%. The CaO content can be used to control the crystallization properties. Preference is given to the range from 9% to 15%. Higher contents tend to more significant crystallization. In one embodiment, the CaO content is 8% to 12%.

BaO is present in the inventive glass-ceramic joining material at from 25% to 38%. Preference is given to the range from 30% to 38%. The BaO content ensures the low melting temperature, but also that $BaAl_2Si_2O_8$ forms preferentially as the main crystal phase. It is thus possible to adjust the coefficient of expansion of the glasses.

MgO is optionally present in the inventive joining material at up to 10%. MgO likewise contributes to control of the crystallization properties of the joining material. In addition, the melting temperature and the glass transition temperature $T_g$ can be reduced. The MgO content additionally causes an increase in the coefficient of thermal expansion and thus constitutes a simple means of matching the joining material to the components to be joined. This effect is also based on the fact that the addition of MgO can cause the crystallization of enstatite ($MgSiO_3$) and/or $Mg_2SiO_4$, which is known to be a crystal phase with high thermal expansion ($\alpha_{(20-300)}$ is up to $11 \cdot 10^{-6}$ $K^{-1}$). MgO likewise lowers the glass transition temperature $T_g$. In combination with CaO, the high-expansion crystal phases $CaMgSi_2O_6$ and/or $Ca_3MgSi_2O_8$ can be formed.

In addition, optional additions such as $ZrO_2$ having a content of up to 5% and $Y_2O_3$ at up to 10% are present in the inventive joining material. These oxides can especially act as nucleating agents for the crystallization. The crystallization temperature in particular can be controlled with these additions.

The inventors have recognized that small proportions of $Y_2O_3$ likewise cause stabilization of the glass network, such that $T_g$ is increased. The upper limit of 10% should not be exceeded, since the flow of the joining material is otherwise hindered too significantly. $Y_2O_3$ additionally causes suppression of unwanted cordierite crystallization ($Mg_2Al_4Si_5O_{18}$). This crystal phase is unwanted due to its very low thermal expansion $\alpha_{(20-750)}$ in the range from approx. $0 \cdot 10^{-6}$ to $2 \cdot 10^{-6}$ $K^{-1}$.

Preferably, the inventive glass-ceramic joining material is free, apart from impurities at most, of ZnO and/or PbO and/or $Bi_2O_3$ and/or $TiO_2$ and/or $TeO_2$. "Free apart from impurities at most" means that the substances mentioned are not deliberately added to the starting material. However, it is sometimes unavoidable, or unfeasible in terms of cost and processing efforts, to completely avoid contamination with these components caused by natural distribution of these substances in the desired components or by the processing in glass production. It may therefore be the case that small amounts of these substances mentioned are present in the inventive joining material owing to these impurities. The content of these individual components in the inventive joining material, however, preferably does not exceed 0.2 mol % of each. Of course, the invention encompasses complete freedom from these substances.

It has been found that the oxides $TeO_2$ and $Bi_2O_3$ are not stable with respect to reduction-oxidation reactions and can readily form alloys with the metallic interconnector of a fuel cell, even though they would be suitable in principle for lowering the softening temperature of the glasses. ZnO is electrochemically unstable since it promotes degradation by lowering the specific resistance of the bond. During the operation of a fuel cell, significant ZnO contents lead to interfacial crystallization in which ZnO-containing spinels are formed, and these in turn lower the electrical resistance of the joint.

It is likewise preferable that the inventive glass-ceramic joining material is free, apart from impurities at most, of alkali metals and/or oxides thereof and/or SrO. It has been found that SrO, on contact with materials of high chromium content, can likewise exhibit unwanted interfacial reactions, which leads to unwanted interfacial phases. The strontium chromate formed likewise has a coefficient of thermal expansion very different from the vitreous or glass-ceramic joining material, and this is the reason why unstable bonds can result on the basis of the mechanisms described. As already described, impurities might be hard to avoid. Therefore SrO impurities might be contained in the inventive joining material up to a maximum content of 0.2 mol %.

Alkali metals are undesirable because they are reputed to adversely affect the electrical insulation properties. Chemical stability also falls with rising content of alkali metals.

The crystallization of the starting glass preferably gives rise to $BaAl_2Si_2O_8$ as the main crystal phase. The inventive glass-ceramic joining material thus preferably has $BaAl_2Si_2O_8$ as the main crystal phase.

Further additions are of course possible in the inventive glass-ceramic joining material, and are likewise encompassed by the invention. For example, impurities of up to 0.2% each caused by raw materials or else by refining agents, for example $As_2O_3$ and/or $Sb_2O_3$ and/or SrCl, may be present in the inventive joining material.

The crystallization properties of the inventive joining material may, as well as the balance of the components described, also be determined by the temperature control in the joining operation. The joining operation is a subsequent thermal treatment compared to glass production by melting of the raw materials. The crystallization conducted in the subsequent thermal treatment can shift the softening to higher temperatures, and the control of the crystallization can match the inventive joining material to the respective end use.

The $SiO_2$ and CaO contents described can prevent what is called a crystobalite jump in the thermal expansion curve, where low crystobalite is converted to high crystobalite.

Because the inventive joining material is preferably at least very substantially free of SrO, there is likewise no formation of $SrSi_2O_5$ and/or $SrSiO_3$ and/or $Sr_2SiO_4$ and/or $Sr_2Si_3O_8$ and/or $Sr_2MgSi_2O_7$ as crystal phases. Formation of trydinnite can likewise be avoided through the inventive CaO contents.

In a preferred embodiment, the inventive glass-ceramic joining material is in the form of a composite, meaning that it contains, as well as the components mentioned within the ranges mentioned, up to 30% by weight of a filler. Preferred fillers are MgO and/or YSZ and/or wollastonite powder and/or zirconium oxide fibers.

The sphere temperature of the inventive joining material can be measured quite accurately and is preferably not more than 800° C. Depending on the temperature and time parameters of the joining process, in most cases this corresponds approximately to the joining temperature, which is otherwise not determinable accurately.

The inventive joining material is generally produced by melting the ingredients in a customary glass melt known to those skilled in the art to give a glass, which is subsequently ground to a glass powder. The glass powder can be introduced into the bond, for example, in the form of a dispensable paste or of a presintered moulding.

After production thereof, the inventive joining material can be ground as a possible application and used as a filler in other materials, but especially in other joining materials or glasses.

It is a particular advantage of the invention that the starting glass does not need any additional nucleating agents and/or additions which bring about the crystallization of the joining material. Thus, rapid processing of the material is possible.

With the inventive glass-ceramic joining material, it is possible to produce bonds comprising the inventive glass-ceramic joining material. Preferably it is thus possible to produce bonds between at least two metal components, especially made from ferritic or chromium-containing steels and/or chromium alloys, in which the at least two metal components are bonded with the inventive joining material. Likewise possible and preferred are bonds between at least two ceramic components, especially made from yttrium and/or scandium-stabilized zirconium oxide, in which the at least two ceramic components are bonded with the inventive joining material. Additionally possible and preferred are bonds between at least one metal component and a ceramic component, especially made from the materials mentioned above in each case, in which the at least one metal component and the at least one ceramic component are bonded with the inventive joining material. Preference is given to producing stacks of the bonds mentioned.

Optimal strengths of a bond can be achieved when the thermal expansion of the joining material is optimized to the materials to be bonded. Moreover, any change in the coefficient of thermal expansion must also not give rise to any excessive stresses in the material during the crystallization process. The inventive joining material ensures this, inter alia, by the avoidance of unwanted crystal phases.

On the basis of its physical properties, the inventive joining material is particularly suitable for the production of bonds which must not be exposed to excessively high temperatures in the course of production. This relates particularly to the temperature range below 800° C. It is particularly suitable for the production of a gas-tight, electrically insulating bond of materials having a thermal expansion $\alpha_{(20-300)}$ of at least $9.5 \cdot 10^{-6}$ $K^{-1}$. Such materials are, for example, widespread and feasibly producible ferritic stainless steels (for example AISI 410, AISI 430).

Such bonds in the high-temperature sector can be used particularly advantageously in fuel cells, especially SOFCs (solid oxide fuel cells). One example of an application in fuel cells is the bonding of individual SOFCs to give an SOFC stack. A further example is high-temperature electrolysis units (SOECs). The electrolytes thereof typically make particular demands on the chemical stability of the materials which surround them and hence also on the joining material. Therefore, the invention relates more particularly also to a fuel cell or electrolysis unit including bonds with the inventive glass-ceramic joining material.

Further fields of application are sensors in combustion units, for example automotive applications, ships' engines, power plants, aircraft, and/or in aerospace. A preferred application is the use of the inventive glass-ceramic joining material for the production of sensors and/or actuators, for example in the exhaust gas line and/or in the combustion chamber of power generation units, for example of motor vehicles with internal combustion engines, gas turbines, aircraft turbines, combined heat and power plants, etc. Likewise possible are electrical executions, especially in nuclear power plants, fusion power plants, heating plants, solar furnaces and/or chemical reactors etc.

However, the inventive glass-ceramic joining material can also be used for production of sintered bodies with high thermal stability. Production processes for sintered bodies are sufficiently well known. In general, this involves mixing the starting material of the inventive joining material together in powder form, optionally blending it with a generally organic binder, and pressing it into the desired shape. Instead of the powder of the starting materials, it is also possible to grind an already molten inventive material and mix it with the binder. The pressed joining material body or joining material-binder body is then brought to sintering temperature, at which the components can sinter together at the sintering temperature and in case the binder is used the binder can burn off. The sintered bodies thus obtained can then be brought into contact with the components to be bonded and bond them and/or be bonded therewith by a soldering operation.

The use of sintered bodies in soldering has the advantage that the sintered body is a shaped component and can be converted to virtually any geometries. An example of a frequently used shape is a hollow cylinder, which can be introduced together with an electrical contact pin into leadthrough passages of metal components in order to obtain, through the soldering, a preferably hermetically sealed glass/metal leadthrough or glass-ceramic/metal leadthrough with an electrically insulated contact pin. Such leadthroughs are used in many electrical components and are known to those skilled in the art.

A further preferred application of the inventive glass-ceramic joining material is the production of films comprising the joining material. Such films are constructed similarly to the above-described sintered bodies but may be substantially flexible. Shapes can be cut out of them and used advantageously to bond flat components with one another.

EXAMPLES

The invention is described in detail hereinafter with reference to the properties of inventive joining materials.

The composition of illustrative amorphous base glasses of the inventive joining materials and the physical properties thereof are summarized in Table I. The proportions of the components are stated in mol % based on oxide. The symbols in Table I have the following meanings:

$\alpha_{(20-300)}$ coefficient of linear thermal expansion from 20° C. to 300° C.

$T_g$ glass transition temperature

PR processing temperature, log $\eta$ corresponds to 4, $\eta$ in [dPas]

$T_{sinter}$ sintering temperature $T_{sphere}$ sphere temperature $T_{hemisphere}$ hemisphere temperature $T_{flow}$ flow temperature To produce the examples, the starting material was first melted in a glass melt. Subsequently, this was used, through a grinding process, to produce the generally pulverulent vitreous joining material. In the present examples, the molten joining materials were used to provide a powder having a particle size distribution having a D(50) of approx. 10 μm and a D(99)<63 μm.

This was followed by the thermal characterization of the joining materials by means of a heating microscope (HM). For this purpose, a cylindrical test specimen is pressed from the joining material in powder form to be characterized, and this is heated at 10 K per minute on a ceramic base plate. The changes in shape of the test specimen are observed. In this way, the sphere temperature can be determined.

In spite of the low $SiO_2$ concentration and the small sum total of all network formers, these examples are suitable as joining materials and do not crystallize prior to the softening of the glass. The inventive material of Table I shows values of $T_{sphere}$ well below 800° C. The components are joined with the inventive joining material typically at $T_{sphere}$, and so $T_{sphere}$ corresponds very substantially to the applied joining temperature.

In the course of joining, the crystallization of the joining material is triggered. The crystallized, i.e. glass-ceramic, joining material then has an elevated melting temperature compared to the starting material, which corresponds to the melting temperature of the main crystal phase on full crystallization. By virtue of this temperature jump, components bonded with the glass-ceramic joining materials can be exposed to higher temperatures than required in the course of production thereof. This makes it possible to actually produce some components in the first place. Physical data for the example base glasses according to Table I are summarized after thermal treatment, in which particularly the crystallization is triggered, in Table II.

The thermal treatment was effected in two stages. First of all, there was a pretreatment in which the amorphous base glass was heated at a heating rate of 5 K per minute to 800° C. for the amorphous base glass according to comparative example no. 1, and 730° C. for the amorphous base glass according to inventive example no. 2. This temperature was maintained for 30 minutes, followed by cooling at a rate of 2 K per minute down to room temperature. In the thermal aftertreatment, the actual crystallization step was undertaken. There was again a heating operation at a heating rate of 5 K per minute to the age-hardening temperature specified in Table II in each case under air, and this was maintained for the hold time specified in each case. This was followed by cooling at the rate of 2 K per minute down to room temperature. The softening temperature $T_{softening}$ and the sphere temperature $T_{sphere}$ were measured on these aftertreated joining materials, for three different hold times in the aftertreatment in each case. The softening temperature is a measure of the temperature to which a bond with the inventive joining material can be exposed for prolonged periods. It corresponds very substantially to the maximum operating temperature.

It can be stated in general terms that the crystallization of the amorphous base glass in the examples shown occurs not with a hold time of 0.5 h but only with much longer hold times. The at least partly crystallized material melts at higher temperatures than the amorphous base glass and/or quasi-amorphous aftertreated material. The main crystal phase in the inventive example is $BaAl_2Si_2O_8$.

Example no. 1 is a comparative example of a crystallizing glass solder which, as the analysis by means of HT-XRD shows, begins to crystallize at temperatures of 725° C. At processing temperatures of less than 700° C., it remains substantially amorphous.

With a hold time of 500 h at an age-hardening temperature of 700° C., there is a jump in the value of $\alpha_{(20-300)}$. The same value of $\alpha_{(20-300)}$ is also attained for a hold time of 1000 h. The crystallization also gives rise to a high-expansion crystal phase as the main crystal phase, principally hexacelsian, which is desirable for particularly applications, especially when high-expansion steels are the joining partners. The constancy of the values for $\alpha_{(20-300)}$ for both hold times demonstrate the stability of the joining material.

In inventive example no. 2, barely any change in the value of $\alpha_{(20-300)}$ over the hold times is observed, at most a decreasing tendency with increasing softening temperature. This behaviour is desirable for some applications in which the joining partners have relatively low thermal expansion.

The inventive glass-ceramic joining materials have the advantage that, owing to the low joining temperatures mentioned in the course of production of a bond, they prevent or at least reduce the corrosion reactions of the steels used; for example, significant oxide growth, chromium vaporization etc. is reduced by the lower temperatures. It is thus possible to use more feasibly producible and more easily purchasable steels. In addition, the lower processing temperatures can save energy.

The inventive bonds are likewise more tolerable with respect to thermal cycling owing to lower thermal stresses at the processing and/or operating temperatures which occur. Thus, the target lifetimes of a fuel cell of more than 40,000 operating hours seem to be achievable. The inventive glass-ceramic joining materials can likewise advantageously compensate for the mechanical stresses which arise in the course of operation of a fuel cell or electrolysis unit, which arise, for example, through deviations from planarity of components (for example interconnector plates), since the viscosity of the inventive joining material is comparatively low. However, if the viscosity of the joining material used is too high, the flexural stresses which arise can lead to leaks and hence to a declining performance in operation.

It is surprising that these advantages are achieved by the inventive joining materials which have a low proportion of $SiO_2$, and which additionally contain a relatively low content of network formers, and the crystallization of which can nevertheless be controlled by virtue of the increased proportion of $B_2O_3$. Within the target range of operating temperatures of preferably 650° C. to 750° C., there is advantageously no vaporization of $B(OH)_3$, which would lead to degeneration of the bond.

TABLE I

Properties of the Amorphous Base Glasses

|  | No. 1 (Comparative Ex.) | No. 2 |
|---|---|---|
| $SiO_2$ | 21.6 | 4.7 |
| $Al_2O_3$ | 11.9 | 14.5 |
| $B_2O_3$ | 17.5 | 33.6 |
| CaO | 13.0 | 9.8 |
| BaO | 36.0 | 37.5 |
| $\alpha_{(20\text{-}300)}$ [$10^{-6}$ $K^{-1}$] | 9.8 | 10.0 |
| $T_g$ [° C.] | 567 | 530 |
| PR [° C.] | 871 | 744 |
| $T_{sinter}$ [° C.] | 619 | 557 |
| $T_{sphere}$ [° C.] | 768 | 649 |
| $T_{hemisphere}$ [° C.] | 823 | 674 |
| $T_{flow}$ [° C.] | 872 | 844 |

TABLE II

Properties of the Thermally Treated Base Glasses

No. 1 (Comparative Ex.)

| Pretreatment | Heating to 800° C. at 5 K/min, Holding for 30 min, Cooling to room temp. at 2 K/min | | |
|---|---|---|---|
| Aftertreatment | Heating to age-hardening temp. at 5 K/min, Hold over hold time, Cooling to room temp. at 2 K/min | | |
| Hold time [h] | 0.5 | 500 | 1000 |
| Age-hardening temperature | 800 | 700 | 700 |
| $\alpha_{(20\text{-}300)}$ [$10^{-6}$ $K^{-1}$] HM analysis | 9.7 | 10.8 | 10.8 |
| $T_{softening}$ [° C.] | 729 | 982 | 992 |
| $T_{hemisphere}$ [° C.] | 835 | 989 | 1006 |
| Comment | quasi-amorphous | semicrystalline | semicrystalline |

TABLE II-continued

Properties of the Thermally Treated Base Glasses

No. 2

| Pretreatment | Heating to 730° C. at 5 K/min, Holding for 30 min, Cooling to room temp. at 2 K/min | | |
|---|---|---|---|
| Aftertreatment | Heating to age-hardening temp. at 5 K/min, Hold over hold time, Cooling to room temp. at 2 K/min | | |
| Hold time [h] | 0.5 | 500 | 1000 |
| Age-hardening temperature | 730 | 650 | 650 |
| $\alpha_{(20\text{-}300)}$ [$10^{-6}$ $K^{-1}$] HM analysis | 9.8 | 9.7 | 9.5 |
| $T_{softening}$ [° C.] | 644 | 804 | 810 |
| $T_{hemisphere}$ [° C.] | 744 | 826 | 834 |
| Comment | quasi-amorphous | semicrystalline | semicrystalline |

While the invention has been illustrated and described as embodied in glass-ceramic joining materials and use thereof, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. An article comprising a bond between at least two metal components;
   wherein said bond comprises a glass-ceramic joining material and said metal components are joined by said joining material;
   wherein said glass-ceramic joining material has a coefficient of thermal expansion $\alpha_{(20\text{-}300)} \geq 9.5 \cdot 10^{-6}$ $K^{-1}$; and
   wherein said glass-ceramic joining material, apart from at most impurities, is free of ZnO and free of PbO, and comprises, in mol % based on oxide content:

| $SiO_2$ | 3-<10 |
|---|---|
| $B_2O_3$ | 16-34 |
| $Al_2O_3$ | 7-15 |
| CaO | 8-40 |
| BaO | 25-38 |
| MgO | 0-10 |
| $ZrO_2$ | 0-5 |
| $Y_2O_3$ | 0-10. |

2. An article comprising a bond between at least two metal components;
   wherein said bond comprises a glass-ceramic joining material and said metal components are joined by said joining material; and
   wherein said metal components are composed of ferritic stainless steel;
   wherein said glass-ceramic joining material has a coefficient of thermal expansion $\alpha_{(20\text{-}300)} \geq 9.5 \cdot 10^{-6}$ $K^{-1}$; and
   wherein said glass-ceramic joining material, apart from at most impurities, is free of ZnO and free of PbO, and comprises, in mol% based on oxide content:

| | |
|---|---|
| SiO$_2$ | 3-<10 |
| B$_2$O$_3$ | 16-34 |
| Al$_2$O$_3$ | 7-15 |
| CaO | 8-40 |
| BaO | 25-38 |
| MgO | 0-10 |
| ZrO$_2$ | 0-5 |
| Y$_2$O$_3$ | 0-10. |

3. An article comprising a bond between at least two ceramic components;
  wherein said bond comprises a glass-ceramic joining material and said ceramic components are joined by said joining material;
  wherein said glass-ceramic joining material has a coefficient of thermal expansion $\alpha_{(20-300)} \geq 9.5 \cdot 10^{-6}$ K$^{-1}$; and
  wherein said glass-ceramic joining material, apart from at most impurities, is free of ZnO and free of PbO, and comprises, in mol% based on oxide content:

| | |
|---|---|
| SiO$_2$ | 3-<10 |
| B$_2$O$_3$ | 16-34 |
| Al$_2$O$_3$ | 7-15 |
| CaO | 8-40 |
| BaO | 25-38 |
| MgO | 0-10 |
| ZrO$_2$ | 0-5 |
| Y$_2$O$_3$ | 0-10. |

4. An article comprising a bond between at least two ceramic components;
  wherein said bond comprises a glass-ceramic joining material and said ceramic components are joined by said joining material; and
  wherein said ceramic components are composed of yttrium and/or scandium-stabilized zirconium oxide;
  wherein said glass-ceramic joining material has a coefficient of thermal expansion $\alpha_{(20-300)} \geq 9.5 \cdot 10^{-6}$ K$^{-1}$; and
  wherein said glass-ceramic joining material, apart from at most impurities, is free of ZnO and free of PbO, and comprises, in mol% based on oxide content:

| | |
|---|---|
| SiO$_2$ | 3-<10 |
| B$_2$O$_3$ | 16-34 |
| Al$_2$O$_3$ | 7-15 |
| CaO | 8-40 |
| BaO | 25-38 |
| MgO | 0-10 |
| ZrO$_2$ | 0-5 |
| Y$_2$O$_3$ | 0-10. |

5. An article comprising a bond between at least one metal component and at least one ceramic component;
  wherein said bond comprises a glass-ceramic joining material and said at least one metal component and said at least one ceramic component are joined by said bond;
  wherein said glass-ceramic joining material has a coefficient of thermal expansion $\alpha_{(20-300)} \geq 9.5 \cdot 10^{-6}$ K$^{-1}$; and
  wherein said glass-ceramic joining material, apart from at most impurities, is free of ZnO and free of PbO, and comprises, in mol% based on oxide content:

| | |
|---|---|
| SiO$_2$ | 3-<10 |
| B$_2$O$_3$ | 16-34 |
| Al$_2$O$_3$ | 7-15 |
| CaO | 8-40 |
| BaO | 25-38 |
| MgO | 0-10 |
| ZrO$_2$ | 0-5 |
| Y$_2$O$_3$ | 0-10. |

6. An article comprising a bond between at least one metal component and at least one ceramic component;
  wherein said bond comprises a glass-ceramic joining material and said at least one metal component and said at least one ceramic component are joined by said bond; and
  wherein said at least one metal component is composed of ferritic stainless steel and said at least one ceramic component is composed of yttrium and/or scandium-stabilized zirconium oxide;
  wherein said glass-ceramic joining material has a coefficient of thermal expansion $\alpha_{(20-300)} \geq 9.5 \cdot 10^{-6}$ K$^{-1}$; and
  wherein said glass-ceramic joining material, apart from at most impurities, is free of ZnO and free of PbO, and comprises, in mol% based on oxide content:

| | |
|---|---|
| SiO$_2$ | 3-<10 |
| B$_2$O$_3$ | 16-34 |
| Al$_2$O$_3$ | 7-15 |
| CaO | 8-40 |
| BaO | 25-38 |
| MgO | 0-10 |
| ZrO$_2$ | 0-5 |
| Y$_2$O$_3$ | 0-10. |

7. A fuel cell comprising a glass-ceramic joining material having a coefficient of thermal expansion $\alpha_{(20-300)} \geq 9.5 \cdot 10^{-6}$ K$^{-1}$, said glass-ceramic joining material comprising, in mol% based on oxide content:

| | |
|---|---|
| SiO$_2$ | 3-<10 |
| B$_2$O$_3$ | 16-34 |
| Al$_2$O$_3$ | 7-15 |
| CaO | 8-40 |
| BaO | 25-38 |
| MgO | 0-10 |
| ZrO$_2$ | 0-5 |
| Y$_2$O$_3$ | 0-10. |

8. A method of producing a bond in a fuel cell, an electrolysis cell, a sensor or an actuator, said method comprising making said bond with a glass-ceramic joining material;
  wherein said glass-ceramic joining material has a coefficient of thermal expansion $\alpha_{(20-300)} \geq 9.5 \cdot 10^{-6}$ K$^{-1}$; and
  wherein said glass-ceramic joining material, apart from at most impurities, is free of ZnO and free of PbO, and comprises, in mol% based on oxide content:

| | |
|---|---|
| SiO$_2$ | 3-<10 |
| B$_2$O$_3$ | 16-34 |
| Al$_2$O$_3$ | 7-15 |
| CaO | 8-40 |
| BaO | 25-38 |
| MgO | 0-10 |
| ZrO$_2$ | 0-5 |
| Y$_2$O$_3$ | 0-10. |

* * * * *